(12) United States Patent
Murphy

(10) Patent No.: US 7,052,048 B2
(45) Date of Patent: May 30, 2006

(54) THROUGH FLANGE

(75) Inventor: James C. Murphy, Chardon, OH (US)

(73) Assignee: Paragon Aquatics, a division of Pentair Pool Products, Inc., LaGrangeville, NY (US)

( * ) Notice: Subject to any disclaimer, the term of this patent is extended or adjusted under 35 U.S.C. 154(b) by 185 days.

(21) Appl. No.: 10/231,578

(22) Filed: Aug. 30, 2002

(65) Prior Publication Data

US 2004/0041397 A1   Mar. 4, 2004

(51) Int. Cl.
*F16L 41/00* (2006.01)

(52) U.S. Cl. .............................. 285/139.1; 285/139.2; 285/139.3; 285/141.1; 285/192; 285/201; 220/601; 220/661

(58) Field of Classification Search ............... 285/197, 285/201, 139.1, 141.1, 180, 192, 139.2, 139.3, 285/142.1, 143.1, 213, 215; 220/601, 661
See application file for complete search history.

(56) References Cited

U.S. PATENT DOCUMENTS

| | | | | |
|---|---|---|---|---|
| 978,504 A | * | 12/1910 | Stewart | 285/209 |
| 1,049,283 A | * | 12/1912 | Westphal | 285/209 |
| 1,364,814 A | * | 1/1921 | Saucke | 285/208 |
| 2,395,556 A | | 8/1940 | Kopplin | |
| 2,721,580 A | | 11/1950 | Greer | |
| 3,062,507 A | | 11/1957 | Andrus | |
| 3,033,514 A | * | 5/1962 | Grosch | 251/145 |
| 3,159,306 A | | 7/1963 | Lyall | |
| 3,458,084 A | | 6/1968 | Laurizio | |
| 3,406,987 A | * | 10/1968 | Hunder et al. | 403/11 |
| 3,481,310 A | * | 12/1969 | Alburger | 119/72.5 |
| 3,823,250 A | * | 7/1974 | De Monsy et al. | 174/23 R |
| 4,256,333 A | * | 3/1981 | Jones | 285/22 |
| 4,588,106 A | | 5/1986 | Stark, Sr. et al. | |
| 6,138,861 A | | 10/2000 | Palazzo | |
| 6,517,117 B1 | * | 2/2003 | Lai | 285/202 |
| 2003/0178843 A1 | * | 9/2003 | McAliley | 285/197 |

* cited by examiner

*Primary Examiner*—James M. Hewitt
(74) *Attorney, Agent, or Firm*—Pearne & Gordon LLP

(57) ABSTRACT

A through-flange for attaching a pipe to the curved sidewall of a vessel. A flange portion of the through-flange is contoured to match the curvature of the sidewall and thus can be glued directly to the sidewall. A retaining ring also being contoured to match the sidewall is inserted over a tubular portion of the through-flange.

6 Claims, 2 Drawing Sheets

THROUGH FLANGE

BACKGROUND OF THE INVENTION

Through-flanges or "through the wall" pipe connectors are commonly used to connect external pipes to curved sidewalls of pressure vessels. Conventional through-flanges have generally planar flange portions for mating with a curved sidewall. Thus, special gaskets or other complex sealing means are necessary to make a fluid-tight seal between the flange portion and wall.

SUMMARY OF THE INVENTION

The present invention provides a through-flange assembly for a pressure vessel, the through-flange comprising a tubular portion for insertion into a through-hole of a vessel, and a flange portion having a contoured mating surface.

According to another aspect, the present invention provides a retaining collar to be inserted around the tubular portion, the retaining collar having a contoured mating surface.

DETAILED DESCRIPTION OF THE INVENTION

Figure 1:
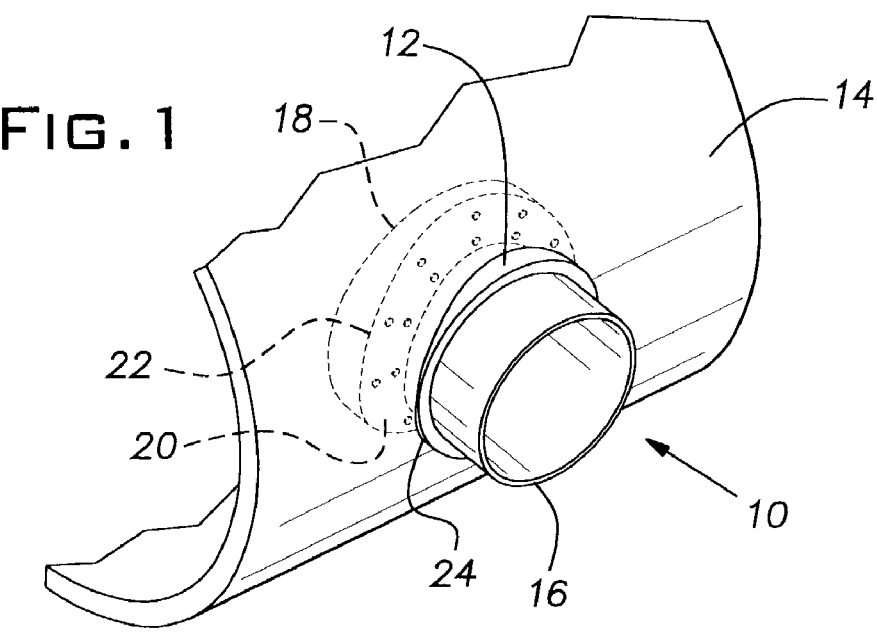
FIG. 1 is a perspective view of a through-flange and collar attached to a cylindrical sidewall according to the present invention.
Figure 2:
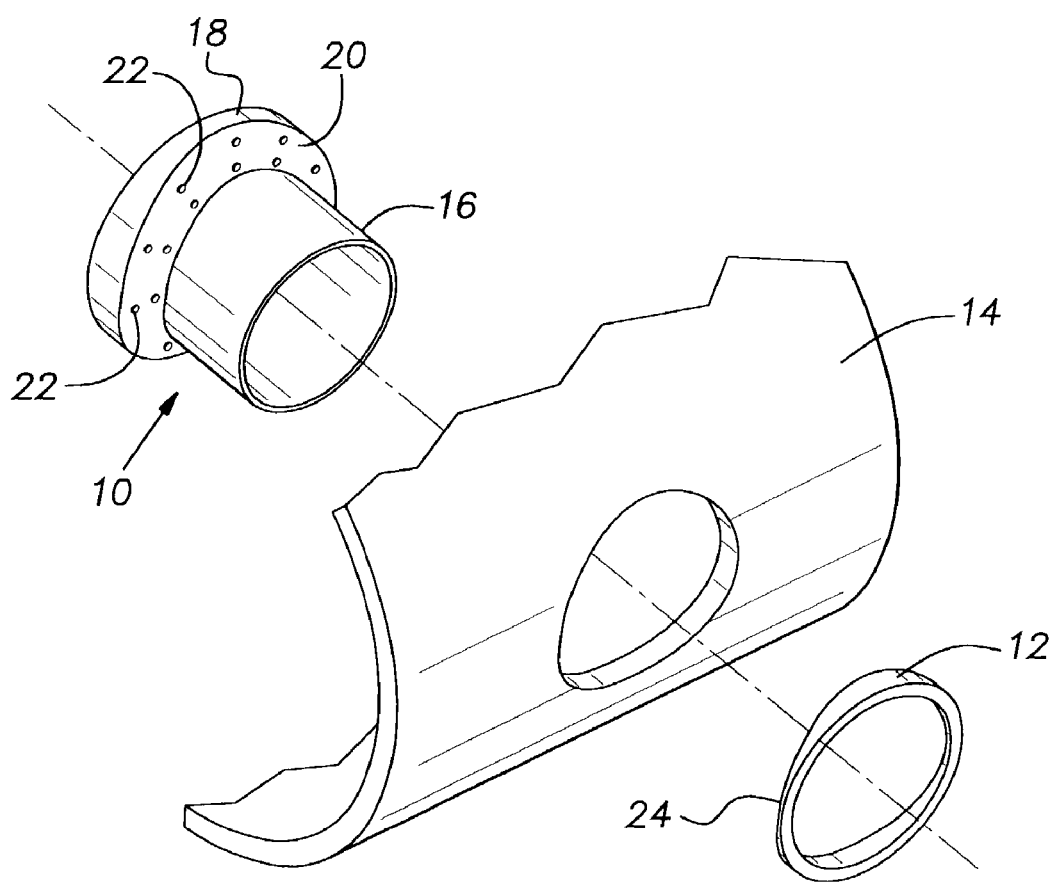
FIG. 2 is an exploded perspective view of the through-flange and collar shown in FIG. 1.
Figure 3:
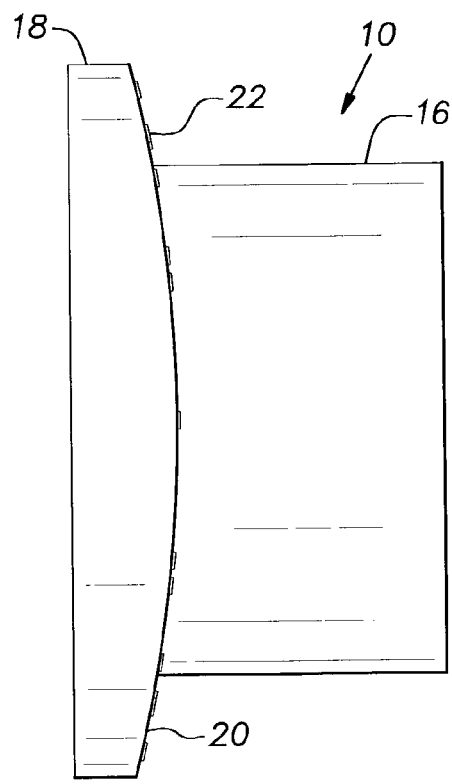
FIG. 3 is a side view of the through-flange of FIG. 1.
Figure 5:
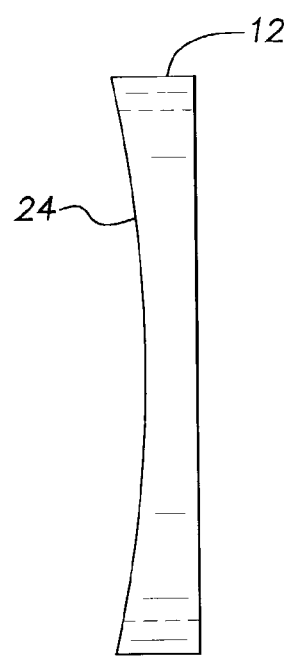
FIG. 5 is a side view of the collar of FIG. 1.
Figure 4:
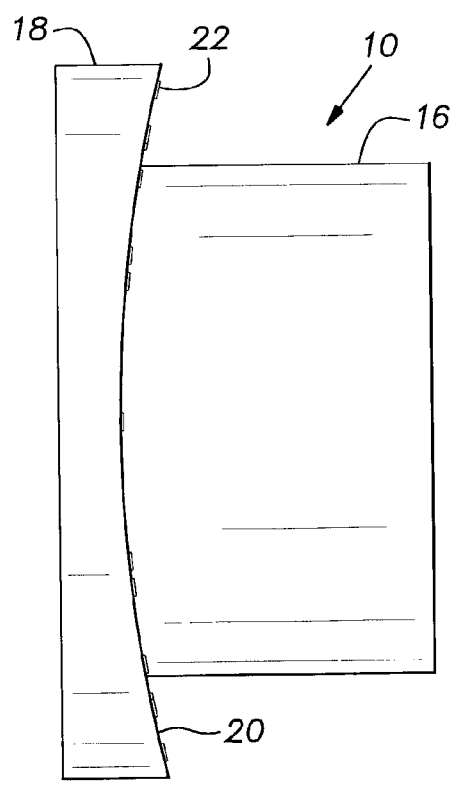
FIG. 4 is a top view of the through-flange of FIG. 1.
Figure 6:
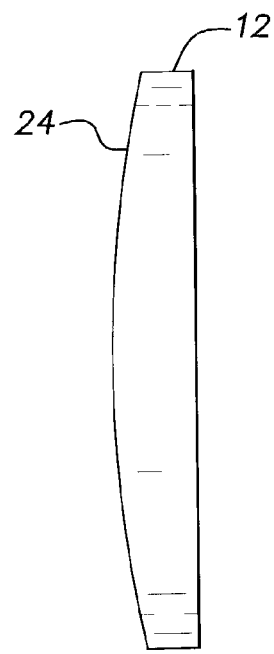
FIG. 6 is a top view of the collar of FIG. 1.

FIGS. 1 and 2 show a through-flange 10 secured by a retaining collar 12 to a cylindrical vessel sidewall 14 according to the present invention. In the present embodiment, the sidewall 14 is the wall of a pressure vessel, such as that used in reverse osmosis filtration systems. FIGS. 3 and 4 show the through-flange 10. FIGS. 5 and 6 show the collar 12.

As shown in FIGS. 1–4, the through-flange 10 comprises a tubular portion 16 and an arcuate or curved flange portion 18. The through-flange 10 can be made of conventional pipe fitting materials, such as metals, polymers or ceramics. In the present embodiment, the through-flange is molded from polyvinylchloride (PVC).

The tubular portion 16 is inserted through a corresponding through-hole in the sidewall 14 until the flange portion 18 is immediately adjacent the sidewall 14. A mating or facing surface 20 of the flange portion 18 that abuts the sidewall 14 is contoured to match the shape of the sidewall 14. The sidewall 14 and the facing surface 20 can be made in other nonplanar shapes besides cylindrical, such as an irregular surface. With the application of a glue or other adhesives, such as epoxies, thermoplastics, thermoset plastics and the like, between the flange portion 18 and the sidewall 14, a fluid-tight seal can be maintained. A plurality of spacers such as bump-like protrusions 22 circumferentially spaced on the facing surface 20 of the flange portion 18 serve to space the facing surface 20 away from the sidewall 14 allowing the adhesive to flow there between. Other spacers could be used in place of the bump-like protrusions 22, such as ribs or posts.

As shown in FIGS. 1, 2, 5 and 6, to further secure the through-flange 10 onto the sidewall 14, the collar 12 is inserted onto the tubular portion 16 so that the sidewall is held between the flange portion and the collar 12. Similar to the facing surface 20 of the flange portion 18, the mating or facing surface 24 of the collar 12 that abuts the sidewall 14 is contoured to match the shape of the sidewall 14. Adhesive may also be applied to the collar 12 to secure it in place.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A through-flange assembly for a pressure vessel, the through-flange assembly comprising:
   a tubular portion for insertion into a through-hole of a vessel;
   a flange portion having a nonplanar mating surface;
   a retaining collar for being inserted around the tubular portion;
   an adhesive applied to the retaining collar;
   a spacer for spacing the nonplanar mating surface of the flange portion away from a sidewall of the vessel; and
   an adhesive applied to the flange portion in a space provided by the spacer.

2. The through-flange assembly according to claim 1, wherein the non-planar mating surface is arcuate in shape.

3. The through-flange assembly according to claim 1, wherein the retaining collar has a non-planar mating surface.

4. The through-flange assembly according to claim 3, wherein the non-planar mating surface of the retaining collar is arcuate in shape.

5. The through-flange assembly according to claim 1, wherein the spacer comprises a plurality of protrusions extending from the mating surface.

6. A pressure vessel comprising a rigid sidewall and a through-flange assembly, the through-flange assembly comprising:
   a tubular portion extending through a through-hole formed in the rigid sidewall;
   a flange portion comprising a nonplanar mating surface positioned adjacent a first side of the rigid sidewall;
   a collar comprising a nonplanar mating surface positioned adjacent a second side of the rigid sidewall;
   an adhesive applied to the collar;
   a spacer for spacing the nonplanar mating surface of the flange portion away from the first side of the rigid sidewall; and
   an adhesive applied to the flange portion in a space provided by the spacer.

* * * * *